United States Patent
Fujimoto et al.

(10) Patent No.: US 10,208,712 B2
(45) Date of Patent: Feb. 19, 2019

(54) CONTROL SYSTEM OF ENGINE

(71) Applicant: Mazda Motor Corporation, Aki-gun, Hiroshima (JP)

(72) Inventors: Masahiko Fujimoto, Hiroshima (JP); Hiroyuki Yamashita, Hirohshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/297,978

(22) Filed: Oct. 19, 2016

(65) Prior Publication Data

US 2017/0138314 A1 May 18, 2017

(30) Foreign Application Priority Data

Nov. 12, 2015 (JP) ................. 2015-222425

(51) Int. Cl.
*F02M 25/022* (2006.01)
*F02D 41/00* (2006.01)
*F02M 25/03* (2006.01)
*F02M 25/038* (2006.01)
*F02D 41/18* (2006.01)
*F02D 41/40* (2006.01)

(52) U.S. Cl.
CPC ....... *F02M 25/0227* (2013.01); *F02D 41/009* (2013.01); *F02D 41/0025* (2013.01); *F02D 41/18* (2013.01); *F02D 41/401* (2013.01); *F02M 25/0221* (2013.01); *F02M 25/03* (2013.01); *F02M 25/038* (2013.01); *F02D 2200/101* (2013.01); *Y02T 10/44* (2013.01)

(58) Field of Classification Search
CPC ..... F02M 25/03; F02M 25/038; F02M 25/022

USPC ................ 123/25 C, 25 A, 25 B, 25 D, 25 P
See application file for complete search history.

(56) References Cited

U.S. PATENT DOCUMENTS 4,122,803 A * 10/1978 Miller .................. F02B 47/02
  123/25 C
4,805,571 A * 2/1989 Humphrey .............. F01L 1/348
  123/25 C (Continued)

FOREIGN PATENT DOCUMENTS

| JP | S4846730 A | 7/1973 |
| JP | 2004076655 A | 3/2004 |
| JP | 4335533 B2 | 9/2009 |

*Primary Examiner* — Hung Q Nguyen
*Assistant Examiner* — Mark L Greene
(74) *Attorney, Agent, or Firm* — Alleman Hall Creasman & Tuttle LLP

(57) ABSTRACT

A control system of an engine including a cylinder and a fuel injector, the fuel mixing with air to form a mixture gas and combusting inside the cylinder is provided, which includes a water injector for injecting supercritical water or subcritical water into the cylinder, and a controller. Within a high engine speed operating range, the controller controls the water injector to inject the one of supercritical water and subcritical water into the cylinder for a given period including a top dead center of the cylinder on compression stroke, such that when an injection amount of the one of supercritical water and subcritical water reaches half of a given injection amount, a crank angle of the engine corresponds to a retarding side of the top dead center, the given injection amount being a total amount of the supercritical water or subcritical water injected for the given period.

4 Claims, 10 Drawing Sheets

(56) References Cited

U.S. PATENT DOCUMENTS

| | | | | |
|---|---|---|---|---|
| 5,522,349 | A * | 6/1996 | Yoshihara | F02B 47/02 123/25 C |
| 6,112,705 | A * | 9/2000 | Nakayama | F02B 47/02 123/25 C |
| 7,421,999 | B2 * | 9/2008 | Kim | F02D 41/0025 123/25 C |
| 9,863,372 | B2 * | 1/2018 | Fujimoto | F02M 25/0224 |
| 2004/0003781 | A1 * | 1/2004 | Yuki | F02B 47/02 123/25 C |
| 2006/0037563 | A1 * | 2/2006 | Raab | F02B 47/02 123/25 C |
| 2010/0229806 | A1 * | 9/2010 | Kemeny | F02B 33/22 123/2 |
| 2013/0054119 | A1 * | 2/2013 | Yokota | F02M 25/03 701/104 |
| 2017/0022892 | A1 * | 1/2017 | Fujimoto | F02B 47/02 |
| 2017/0022923 | A1 * | 1/2017 | Fujimoto | F02D 41/3076 |
| 2017/0022924 | A1 * | 1/2017 | Fujimoto | F02D 41/0057 |
| 2017/0022938 | A1 * | 1/2017 | Fujimoto | F02M 25/03 |

* cited by examiner

CONTROL SYSTEM OF ENGINE

BACKGROUND

The present invention relates to a control system of an engine, which includes a cylinder and a fuel injector for injecting fuel into the cylinder, and in which a mixture gas of the fuel and air combusts inside the cylinder.

Conventionally, in engines, it has been discussed to improve engine performance by injecting water into the cylinder.

For example, JP4335533B discloses an engine which injects supercritical water into a cylinder before or simultaneously with fuel injection, so as to reduce a combustion temperature inside the cylinder and reduce production of NOR.

Here, in engines, it is desired to improve exhaust emission performance and fuel efficiency. Especially within a high engine speed operating range where an engine speed is high, since mechanical resistance increases and exhaust gas is discharged from an engine while its temperature still remains comparatively high, thermal efficiency is low. Therefore, it is desired to improve thermal efficiency and fuel efficiency within this high engine speed operating range.

SUMMARY

The present invention is made in view of the above problems and aims to provide a control system of an engine, which is capable of improving fuel efficiency.

According to one aspect of the present invention, a control system of an engine including a cylinder and a fuel injector for injecting fuel into the cylinder, the fuel mixing with air to form a mixture gas and combusting inside the cylinder is provided. The system includes a water injector for injecting one of supercritical water and subcritical water into the cylinder, and a controller for controlling the fuel injector and the water injector. Within a high engine speed operating range where an engine speed is a given reference speed or above, the controller controls the water injector to inject the one of supercritical water and subcritical water into the cylinder for a given period including a top dead center of the cylinder on compression stroke, such that when an injection amount of the one of supercritical water and subcritical water reaches half of a given injection amount, a crank angle of the engine corresponds to a retarding side of the top dead center, the given injection amount being a total amount of the one of supercritical water and subcritical water injected for the given period.

With the above configuration, the one of supercritical water and subcritical water is injected into the cylinder within the high engine speed operating range where the engine speed is comparatively high and thermal efficiency and fuel efficiency easily degrade. Therefore, the water can progress expansion stroke and an amount of the fuel injected into the cylinder can be suppressed, which results in improving fuel efficiency.

Especially with the above configuration, the one of supercritical water and subcritical water as water is injected into the cylinder, the thermal efficiency and fuel efficiency of the engine can be improved more reliably. Specifically, by injecting the one of supercritical water and subcritical water with a higher density than water in a normal gas phase (water vapor), a large amount of water can efficiently be introduced into the cylinder compared to injecting the water in the gas phase. Therefore, the amount of gas which remains within the cylinder and progresses the stroke, and furthermore an output of the engine, is efficiently increased. Further, by injecting the one of supercritical water and subcritical water, which requires little to no latent heat at all, into the cylinder, compared to injecting water in a normal liquid phase, a significant temperature drop inside the cylinder and the thermal efficiency degradation which accompany the latent heat can be avoided. Therefore, the thermal efficiency can be improved.

Further, within a segment of the high engine speed operating range where an engine load is particularly high, a temperature of exhaust gas becomes extremely high and it is undesirable for an exhaust passage, etc. In this regard, with the above configuration, the water can progress the expansion stroke to suppress the fuel amount as described above. Therefore, a combustion temperature can be reduced to lower the exhaust gas temperature.

Additionally, with the above configuration, within the high engine speed operating range, the one of supercritical water and subcritical water is injected into the cylinder for the given period including the compression top dead center, such that when the injection amount of the one of supercritical water and subcritical water reaches half of the given injection amount, the crank angle of the engine corresponds to the retarding side of the top dead center. Thus, a large total amount of the water injected into the cylinder can be secured and the amount of water supplied on the expansion stroke can be increased. Therefore, the water can progress the expansion stroke even more and fuel efficiency can be improved more reliably.

In the above configuration, the engine may be a four-stroke engine. Within the high engine speed operating range, the controller may control the injection of the one of supercritical water and subcritical water such that the crank angle when the injection amount of the one of supercritical water and subcritical water reaches half of the given injection amount corresponds to a given timing between the top dead center and 15° CA (crank angle) after the top dead center on the compression stroke.

Thus, the water can progress the expansion stroke more effectively.

Further in the above configuration, the system may also include a temperature increasing device for increasing a temperature of the one of supercritical water and subcritical water supplied to the water injector, by using exhaust gas discharged from the engine. Within a low engine speed operating range where the engine speed is below the reference speed, the controller may control the water injector to inject the one of supercritical water and subcritical water for a given period that at least partially overlaps with a period in which a cool-flame reaction of the mixture gas occurs inside the cylinder.

Thus, while improving fuel efficiency within the high engine speed operating range as described above, within the low engine speed operating range where the exhaust gas temperature is comparatively low, an ignition delay time is extended and the combustion is performed at a further retarded timing and, thus, the exhaust gas temperature can be increased. Therefore, also within the low engine speed operating range, the temperature increasing device can suitably increase the temperature of the water supplied to the water injector, by using the exhaust gas, and the one of supercritical water and subcritical water can be supplied to the water injector and the cylinder more reliably.

Further with the above configuration, the controller may control the water injector to inject the one of supercritical water and subcritical water into the cylinder within a high-load, high-speed segment that is a part of the high engine speed operating range where an engine load is a reference load or above, and the controller may control the water injector to stop the injection of the one of supercritical water and subcritical water into the cylinder within a low-load, high-speed segment that is a part of the high engine speed operating range where the engine load is below the reference load.

Thus, within the high-load, high-speed segment where the thermally efficiency particularly easily degrades and the exhaust gas temperature easily becomes high, by injecting the one of supercritical water and subcritical water, the thermal efficiency can effectively be improved and the exhaust gas temperature can effectively be reduced. Whereas within the low-load, high-speed segment, by stopping the injection of the one of supercritical water and subcritical water, the energy required for this injection can be conserved. In other words, the energy required for the generation of the one of supercritical water and subcritical water can be conserved.

DETAILED DESCRIPTION OF EMBODIMENT

Figure 1:
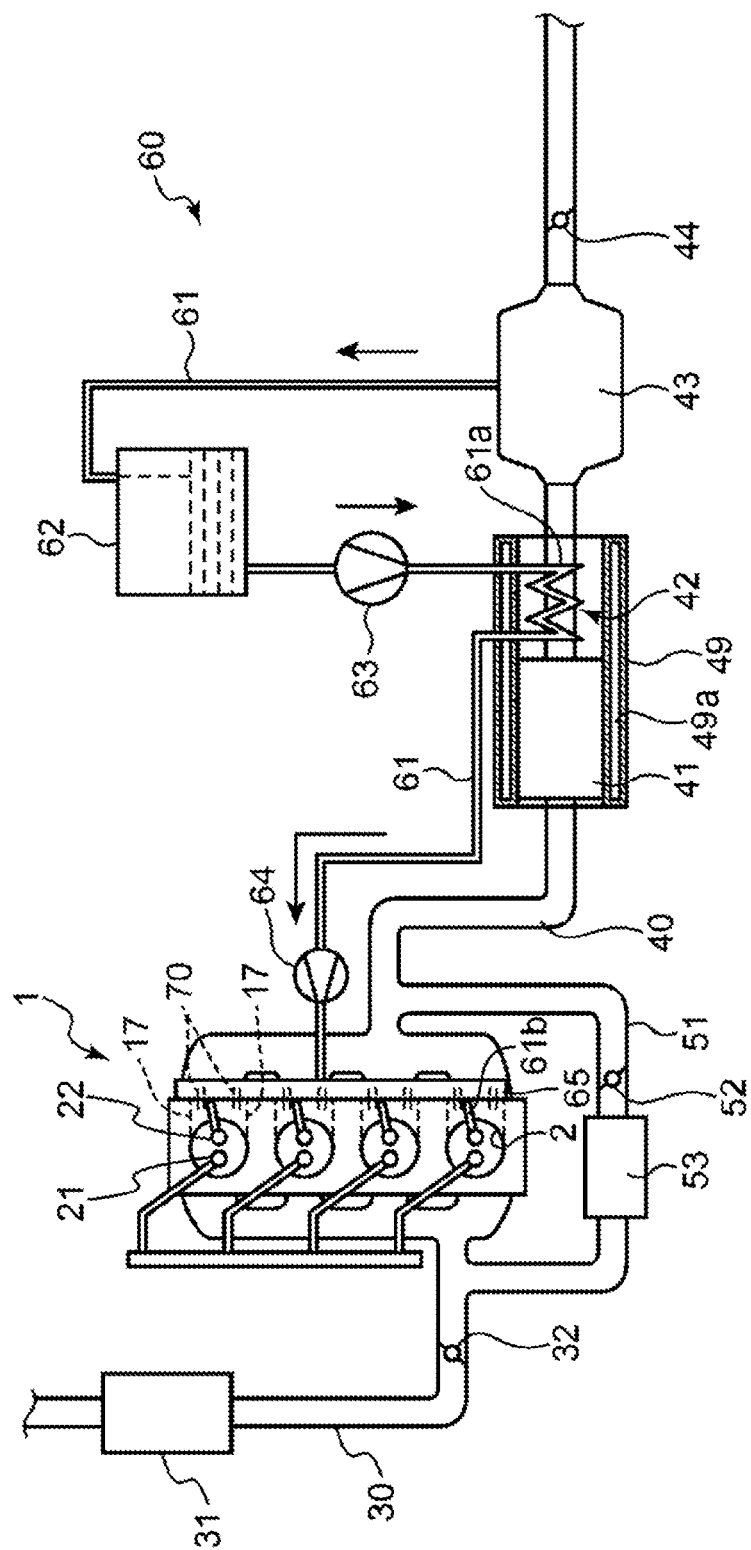
FIG. 1 is a view illustrating a structure of an engine system according to one embodiment of the present invention.

FIG. 1 is a view illustrating a structure of an engine system according to one embodiment of the present invention. The engine system of this embodiment includes an engine 1 of a four stroke type, an intake passage 30 for introducing air for combustion into the engine 1, an exhaust passage 40 for discharging exhaust gas generated in the engine 1, and a water circulation device 60.

The engine 1 is, for example, a four-cylinder engine having four cylinders 2. In this embodiment, the engine 1 is driven by receiving a fuel containing gasoline. The engine system of this embodiment is mounted on a vehicle, and the engine 1 is used as a drive source of the vehicle.

(1) Engine

Figure 2:
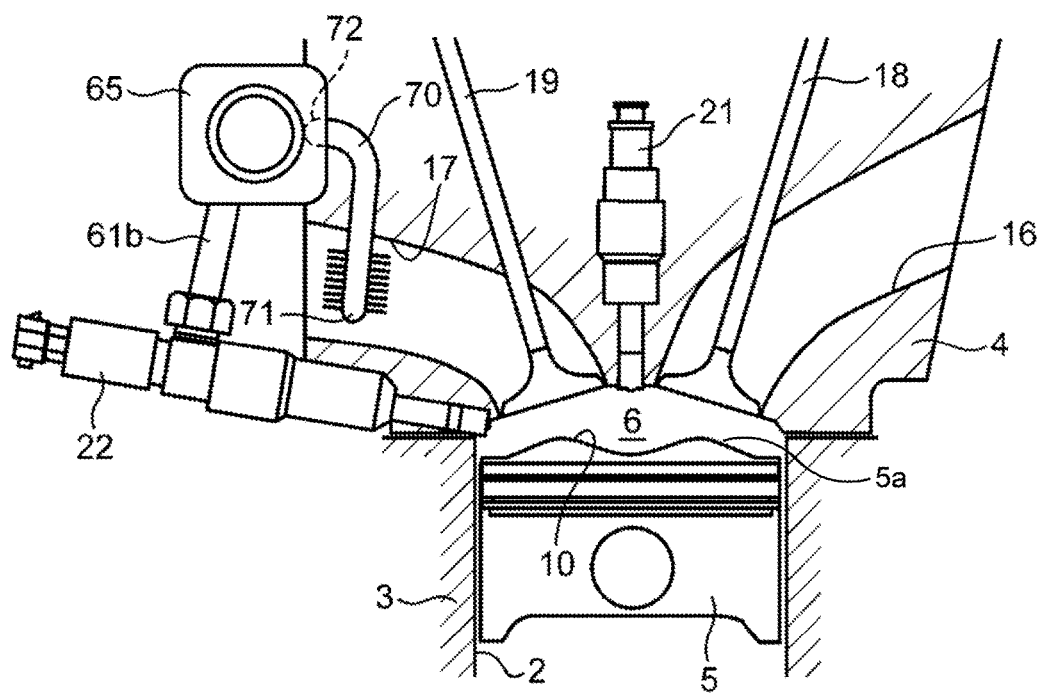
FIG. 2 is a schematic cross-sectional view of an engine.

FIG. 2 is a schematic cross-sectional view of the engine 1.

The engine 1 includes a cylinder block 3 formed therein with the cylinders 2, a cylinder head 4 formed on the cylinder block 3, and pistons 5 fitted into the cylinders 2 to be reciprocatable (in up-and-down directions), respectively.

A combustion chamber 6 is formed above each piston 5. The combustion chamber 6 is a so-called pent-roof type, and a roof surface of the combustion chamber 6 (a bottom surface of the cylinder head 4) has a triangular roof shape formed by two inclining surfaces on an intake side and an exhaust side.

A crown surface 5a of the piston 5 has a cavity 10 formed by denting, to an opposite side from the cylinder head 4 (downward), an area including a center of the crown surface 5a. The cavity 10 is formed to have a volume corresponding to a major part of the combustion chamber 6 when the piston 5 is at a top dead center (TDC).

The cylinder head 4 is formed with intake ports 16 for introducing air supplied from the intake passage 30 into the cylinders 2 (combustion chambers 6), and exhaust ports 17 for guiding out the exhaust gas generated inside the cylinders 2 to the exhaust passage 40, respectively. In this embodiment, each cylinder 2 is formed with two intake ports 16 and two exhaust ports 17. The cylinder head 4 is further provided with intake valves 18 for opening and closing the intake ports 16 on the cylinder 2 side, and exhaust valves 19 for opening and closing the exhaust ports 17 on the cylinder 2 side, respectively.

Each exhaust port 17 is attached with a heat pipe (temperature increasing device) 70. In this embodiment, each exhaust port 17 is provided with one heat pipe 70, i.e., each cylinder 2 is provided with two heat pipes 70. The heat pipes 70 constitute a part of the water circulation device 60, and a detailed description thereof is given later.

Further, fuel injectors (fuel supplier) 21 for injecting the fuel into the cylinders 2, respectively, are provided to the cylinder head 4. Each fuel injector 21 is arranged so that its tip part is located near a center axis of the corresponding cylinder 2 and oriented toward a substantially center portion of the crown surface of the piston 5.

The fuel injector 21 injects fuel pumped from a fuel pump (not illustrated) into the cylinder 2. In this embodiment, a premixed charge compression self-ignition combustion is performed, in which the fuel and air are premixed to form a mixture gas and the mixture gas is compressed to self-ignite near the TDC on compression stroke (CTDC) throughout all operating ranges of the engine body. Accordingly, in the example of FIG. 2, ignition plugs for igniting the gas inside the cylinders 2 are not provided to the engine 1; however, in a case where an additional ignition power is required for suitable combustion of the mixture gas in a cold start etc., the ignition plugs may suitably be provided to the engine 1.

The fuel injector 21 injects into the cylinder 2 the fuel by an amount corresponding to an operating state of the engine 1 at a corresponding timing thereto. In this embodiment, the fuel is injected into the cylinder 2 before the CTDC, so as to cause the mixture gas to self-ignite near the CTDC.

The cylinder head 4 is further provided with water injectors 22 for injecting supercritical water or subcritical water into the cylinders 2, respectively. As illustrated in FIG. 2, each water injector 22 is attached to the cylinder head 4 so as to inject the water into the corresponding combustion chamber 6 from a side thereof, and is arranged so that its tip part is oriented toward an inside of the combustion chamber 6 from an inner circumferential surface of the combustion chamber 6.

Further, the water injector 22 is disposed adjacent to the exhaust port 17. In this embodiment, the water injector 22 is disposed immediately below the exhaust port 17. As the water injector 22, for example, an injector for injecting fuel into the cylinder 2, which is used in conventional engines, may be applied, for which description of a specific structure is omitted here. Note that the water injector 22 injects the supercritical water into the cylinder 2 at about 20 MPa, for example.

The supercritical/subcritical water injection into the cylinders 2 is mainly for improving fuel efficiency.

Specifically, by injecting the water into the cylinders 2, the water is able to function as operation gas to progress expansion stroke. Thus, an amount of fuel supplied to the cylinders 2 is reduced while maintaining the same work amount, i.e., engine output, and fuel efficiency is improved.

Further, using the supercritical water or the subcritical water as the water injected into the cylinders 2 is to reliably improve the thermal efficiency and fuel efficiency of the engine 1. Specifically, by injecting the supercritical water or the subcritical water with a higher density than water in a normal gas phase (water vapor), a large amount of water is efficiently introduced into the cylinders compared to injecting the water in the gas phase. Therefore, the amount of gas which remains within the cylinders and progresses the stroke, furthermore an output of the engine body, is efficiently increased. Further, by injecting one of the supercritical water and the subcritical water, which requires little to no latent heat at all, into the cylinders 2, compared to injecting water in a normal liquid phase, a significant temperature drop inside the cylinders and a thermal efficiency degradation which accompany the latent heat are avoided. Therefore, the thermal efficiency is improved.

Figure 3:
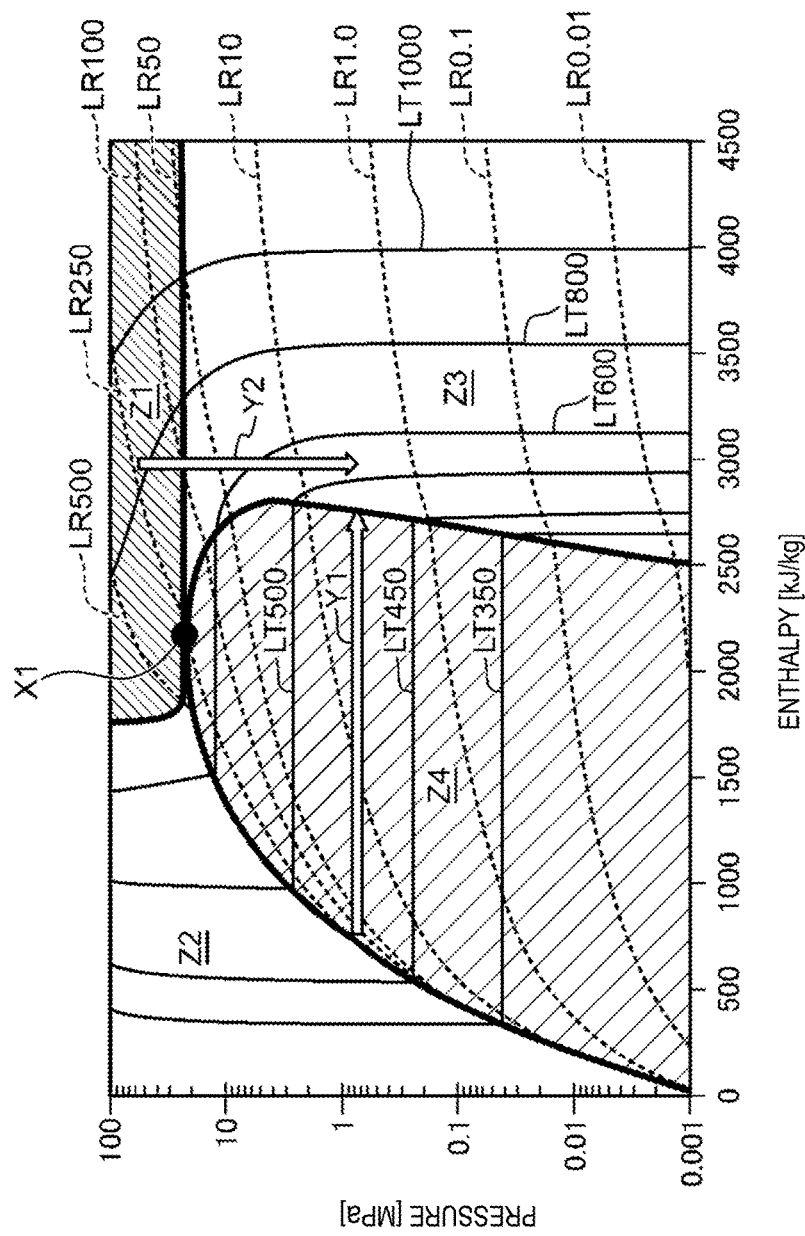
FIG. 3 is a pressure-enthalpy diagram for water, illustrating supercritical water.

A specific description regarding this matter is given with reference to FIG. 3 which is a pressure enthalpy diagram for water, of which a horizontal axis indicates enthalpy and a vertical axis indicates pressure. In FIG. 3, an area Z2 is an area of liquid, an area Z3 is an area of gas, and an area Z4 is an area of coexisting liquid and gas. Lines LT350, LT400, . . . , LT1000 indicated by solid lines are isothermal lines, each formed by connecting points of the same temperature. The numerals of the lines indicate temperatures (K). For example, LT350 is an isothermal line of 350 K, and LT1000 is an isothermal line of 1,000 K. Further, a point X1 is the critical point and an area Z1 is an area where a temperature and pressure are higher than the critical point X1, and the supercritical water belongs to this area Z1. Specifically, while the critical point of water is at the temperature of 647.3 K and the pressure of 22.12 MPa, the temperature and pressure of the supercritical water are the same or above, in other words, the temperature is 647.3 K or above and the pressure is 22.12 MPa or above.

In FIG. 3, lines LR0.01, LR0.1, . . . , LR500 indicated by dashed lines are isopycnic lines, each formed by connecting points of the same density. The numerals of the lines indicate densities (kg/m$^3$). For example, LR0.01 is an isopycnic line of 0.01 kg/m$^3$, and LR500 is an isopycnic line of 500 kg/m$^3$.

As is apparent from comparisons of these isopycnic lines LR with the areas Z1 and Z3, the density of the water within the area Z1, in other words, the supercritical water, is about from 50 kg/m$^3$ to 500 kg/m$^3$, which is close to that of water in the liquid phase and much higher than the density of gas.

Therefore, by injecting the supercritical water with the high density into the cylinders 2, a large amount of water is efficiently introduced into the cylinders compared to injecting the water in the gas phase.

Note that the supercritical water generated by the engine system and injected into the cylinders 2 preferably has a density of 250 kg/m$^3$ or above.

Further, as indicated by the arrow Y1 in FIG. 3, water in a normal liquid phase requires a high enthalpy to change into gas. In other words, the water in the normal liquid phase requires comparatively high latent heat to change into gas. In this regard, as indicated by the arrow Y2, the supercritical water requires almost no enthalpy, in other words, latent heat, to change into water in a normal gas phase.

Therefore, by injecting the supercritical water which does not require latent heat into the cylinders 2, compared to injecting the water in the normal liquid phase, a significant temperature drop inside the cylinders and the thermal efficiency degradation which are accompanied by the latent heat are avoided.

Figure 4:
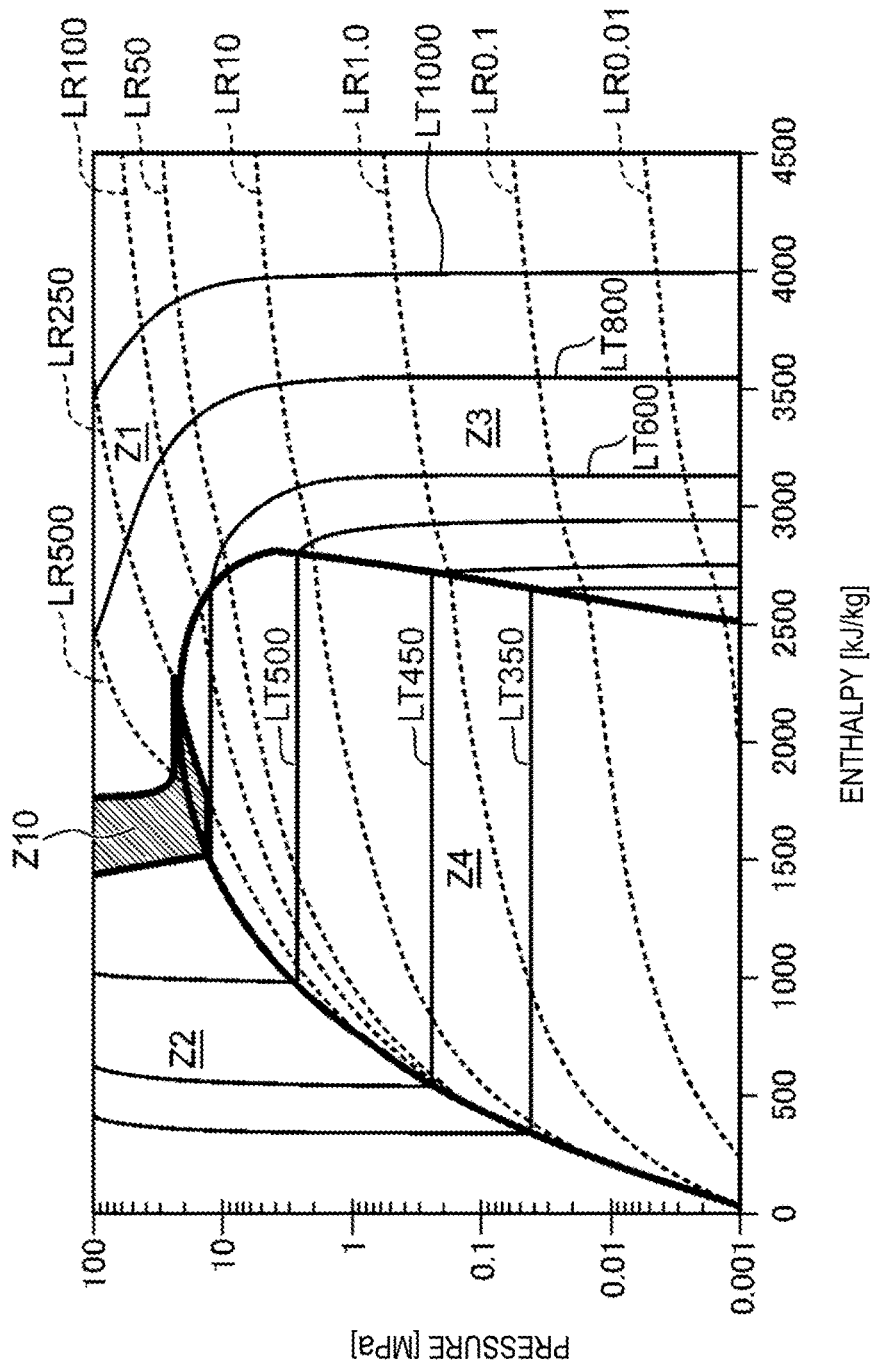
FIG. 4 is a pressure-enthalpy diagram for water, illustrating subcritical water.

Here, as is apparent from FIG. 3, water which belongs to an area near the area Z1 has a high density and requires low latent heat to change into gas, which are properties similar to the supercritical water. Therefore, although the supercritical water is injected into the cylinders 2 in this embodiment as described above, instead of the supercritical water, subcritical water which is water belonging to the area near the area Z1 may be generated and injected into the cylinders 2. For example, subcritical water within an area Z10 where the temperature is 600 K or above and the density is 250 kg/m$^3$ or above (see FIG. 4) may be generated and injected.

(2) Intake Passage

The intake passage 30 is provided with an air cleaner 31 and a throttle valve 32 located in this order from an upstream side. The air passes through the air cleaner 31 and the throttle valve 32 and then is introduced into the engine 1.

The throttle valve 32 opens and closes the intake passage 30. Note that, in this embodiment, while the engine is in operation, the throttle valve 32 is basically kept fully opened or nearly fully opened, and only in a limited operation condition (e.g., the engine is stopped) is the throttle valve 32 closed to block the intake passage 30.

(3) Exhaust Passage

The exhaust passage 40 is provided with, in the following order from its upstream side, a purifying system 41 for purifying the exhaust gas, a heat exchanger (temperature increasing device) 42, a condenser 43, and an exhaust shutter valve 44. The heat exchanger 42 and the condenser 43 constitute a part of the water circulation device 60. The purifying system 41 comprises, for example, a three-way catalyst.

In this embodiment, as illustrated in FIG. 1 etc., the purifying system 41 and the heat exchanger 42 are accommodated inside a heat accumulation case 49 for heat retention of the purifying system 41 and the heat exchanger 42. The heat accumulation case 49 has a dual tube structure, of which an outer circumferential wall forms a space 49*a* therein. The space 49*a* is filled with a heat accumulation agent, and by this heat accumulation agent, the purifying system 41 and the heat exchanger 42 retain heat. In other words, when the exhaust gas at a high temperature flows into the purifying system 41 etc. located inside the heat accumulation case 49, the heat accumulation agent within the space 49*a* is warmed up by the exhaust gas, and then the purifying system 41 and the heat exchanger 42 retains heat by the heat accumulation agent. Examples of the heat accumulation agent include a latent heat accumulation agent that melts by being heated and accumulates thermal energy, such as erythritol, and a chemical heat accumulation agent that causes a chemical reaction by being heated and accumulates thermal energy, such as calcium chloride. By the heat retention with the heat accumulation agent as above, water inside a heat exchanging passage 61*a* (described later) is effectively increased in temperature by the heat exchanger 42, and the purifying system 41 is kept at a more suitable temperature.

The exhaust shutter valve 44 stimulates a recirculation of exhaust gas recirculation (EGR) gas to the intake passage 30.

Specifically, with the engine system of this embodiment, an EGR passage 51 communicating a part of the intake passage 30 downstream of the throttle valve 32 with a part of the exhaust passage 40 upstream of the purifying system 41 is formed, and a portion of the exhaust gas is recirculated to the intake passage 30. Further, the exhaust shutter valve 44 opens and closes the exhaust passage 40. When the EGR is performed and pressure inside the exhaust passage 40 is low, an opening of the exhaust shutter valve 44 is narrowed to increase pressure inside an upstream part of the EGR passage 51 and stimulate the EGR gas recirculation.

The EGR passage 51 is provided with an EGR valve 52 for opening and closing the EGR passage 51, and an amount of the EGR gas recirculated to the intake passage 30 is controlled by adjusting an opening of the EGR valve 52. Further in this embodiment, the EGR passage 51 is provided with an EGR cooler 53 for cooling the EGR gas passing therethrough, and the EGR gas is recirculated to the intake passage 30 after being cooled by the EGR cooler 53.

The EGR valve 52 is, for example, opened within an engine operating range where an engine load is comparatively low, and the EGR gas is introduced into the cylinders 2 within this range.

(4) Water Circulation Device

The water circulation device 60 generates supercritical water by using thermal energy of the exhaust gas.

The water circulation device 60 includes, in addition to the heat pipes 70, the heat exchanger 42 and the condenser 43, a water supply passage 61 connecting the water injectors 22 with the condenser 43, a water tank 62, a low-pressure pump 63, and a high-pressure pump 64.

The condenser 43 condenses water (water vapor) within the exhaust gas passing through the exhaust passage 40, and the water condensed by the condenser 43 is supplied to the water injectors 22. Thus in this embodiment, the water within the exhaust gas is used as the water injected into the cylinders 2. The water tank 62 stores the condensed water therein. The condensed water generated by the condenser 43 is introduced into the water tank 62 through the water supply passage 61 and stored in the water tank 62.

The low-pressure pump 63 is disposed at a position of the water supply passage 61 between the water tank 62 and the heat exchanger 42, and pumps the condensed water inside the water tank 62 to the heat exchanger 42. The condensed water in the water tank 62 is pumped to the heat exchanger 42 by the low-pressure pump 63.

The heat exchanger 42 exchanges heat between the condensed water pumped by the low-pressure pump 63 and the exhaust gas passing through the exhaust passage 40. The heat exchanger 42 is disposed at a position of the exhaust passage 40 downstream of the purifying system 41, to be adjacent to the purifying system 41.

In this embodiment, the part 61a of the water supply passage 61 is inserted into the exhaust passage 40 to be in contact therewith, and thus, the heat exchanger 42 is formed. In other words, the heat exchanger 42 is formed by the part 61a of the water supply passage 61 and the exhaust passage 40 so that the exhaust gas passes outside the part 61a. Hereinafter, the part of the water supply passage 61 inserted into the exhaust passage 40 is referred to as the heat exchanging passage 61a.

The heat exchanging passage 61a is inserted into a part of the exhaust passage 40 immediately downstream of the purifying system 41. Specifically, the heat exchanging passage 61a is inserted into the exhaust passage 40 located inside the heat accumulation case 49. Therefore in this embodiment, the heat exchanger 42 and the heat exchanging passage 61a, as well as the purifying system 41, are heat retained by the heat accumulation case 49.

The condensed water inside the heat exchanging passage 61a is increased in temperature by the exhaust gas passing through the part of the exhaust passage 40 where the heat exchanging passage 61a is inserted. Specifically, if the temperature of the exhaust gas passing through the part of the exhaust passage 40 where the heat exchanging passage 61a is inserted is higher than the temperature of the condensed water inside the heat exchanging passage 61a, the thermal energy is applied to the condensed water from the exhaust gas and the condensed water is increased in temperature. Note that the temperature of the exhaust gas discharged from the engine 1 is constantly at 100° C. or above, which is constantly higher than the temperature of the condensed water in the liquid phase. Therefore, the condensed water inside the heat exchanging passage 61a is always increased in temperature by the exhaust gas.

In this embodiment, since the heat exchanging passage 61a is disposed immediately downstream of the purifying system 41 as described above, the condensed water inside the heat exchanging passage 61a also receives reaction heat at the purifying system 41. Thus the condensed water is effectively increased in temperature. Additionally, the condensed water is effectively increased in temperature by the heat retention of the heat exchanging passage 61a by the heat accumulation case 49.

The high-pressure pump 64 pumps the condensed water from the heat exchanger 42 to the water injectors 22. The high-pressure pump 64 is disposed in the water supply passage 61, between the heat exchanger 42 (i.e., the heat exchanging passage 61a) and the heat pipes 70. The high-pressure pump 64 pumps the supercritical water to the water injectors 22 by pressurizing the condensed water increased in temperature by the heat exchanger 42.

Here, the supercritical water after being highly pressurized by the high-pressure pump 64, flows through a part of the water supply passage 61 downstream of the high-pressure pump 64. Therefore, this part is piped for high-pressure use.

As described above, in this embodiment, the supercritical water is basically generated by increasing the condensed water in temperature and pressure by the heat exchanger 42 and the high-pressure pump 64, and is supplied to the water injectors 22.

Note that if the temperature of the exhaust gas discharged from the cylinders 2 is comparatively high, the water inside the water supply passage 61 is increased in temperature by this high-temperature exhaust gas, through the heat pipes 70.

Specifically, each heat pipe 70 exchanges heat between the water pumped from the high-pressure pump 64 and the exhaust gas passing through the exhaust passage 40. The heat pipe 70 increases the temperature of the condensed water only when the temperature of the exhaust gas is above a reference temperature.

Figure 5:
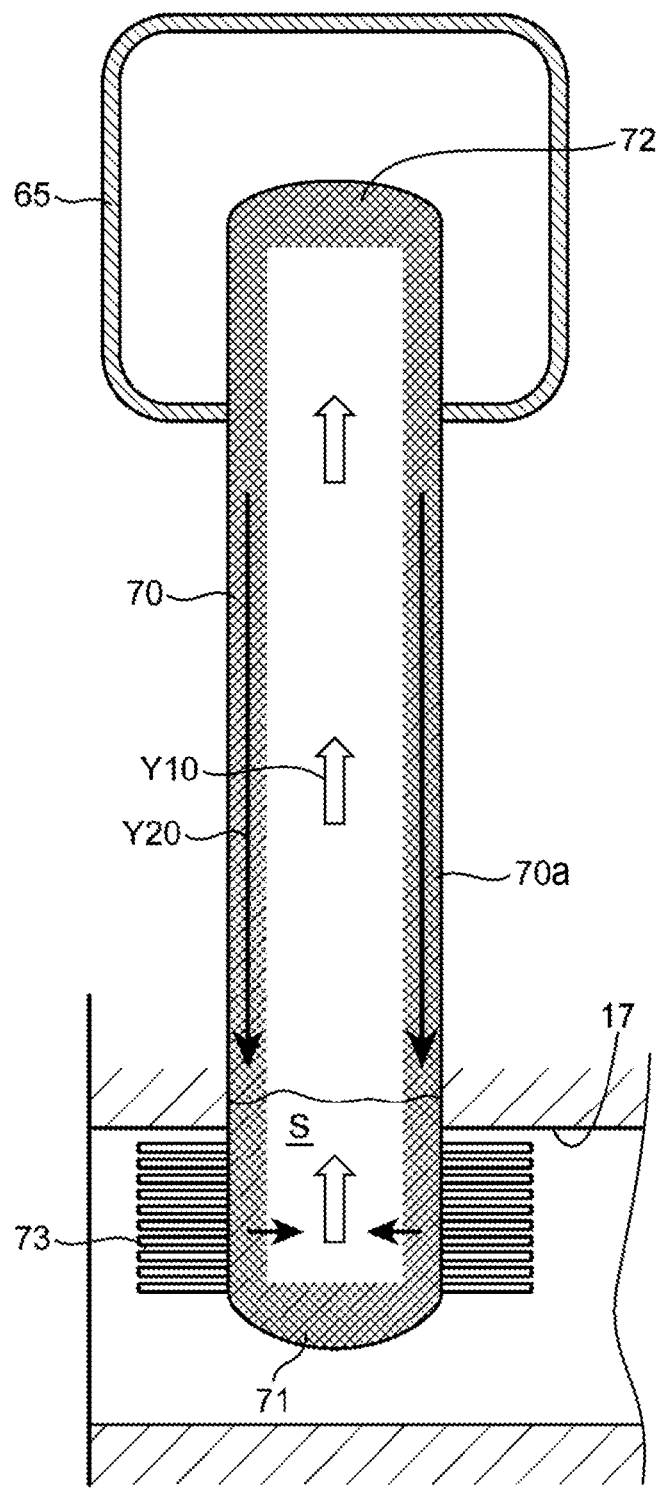
FIG. 5 is a schematic cross-sectional view illustrating an operation of a heat pipe.

In this embodiment, the heat pipe 70 has a substantially circular-column-shaped contour extending in a given direction. FIG. 5 is a schematic cross-sectional view illustrating an operation of the heat pipe 70. As illustrated in this FIG. 5 and also FIG. 2, the heat pipe 70 is arranged so that an end part 71 thereof in its longitudinal directions is inserted into the exhaust port 17 so as to be in contact with the exhaust gas, and the other end part 72 thereof is inserted into the water supply passage 61 so as to be in contact with the water in the water supply passage 61.

As described above with reference to FIGS. 1 and 2, in this embodiment, the heat pipe 70 is inserted into each exhaust port 17. Specifically, a pressure accumulation part 65 extending in the aligned direction of the cylinders 2 is provided to a part of the water supply passage 61 near its downstream end, and independent passages 61b extend toward the water injectors 22, respectively, from the pressure accumulation part 65. Further each exhaust port 17 is provided with one heat pipe 70, and the end parts 71 and 72 of each heat pipe 70 are inserted into the exhaust port 17 and the pressure accumulation part 65, respectively.

In this embodiment, as illustrated in FIG. 2, the pressure accumulation part 65 is disposed near the cylinder head 4, and the heat pipe 70 is built in the cylinder head 4. Specifically, the pressure accumulation part 65 is located above the exhaust ports 17, and the heat pipe 70 extends upward from an inner space of the exhaust port 17 and is inserted into the pressure accumulation part 65. In this embodiment, the end part 71 of the heat pipe 70 on the exhaust port 17 side is provided with a stacked fin 73 formed by stacking metallic plate members in the up-and-down directions, so as to increase the transmitted amount of heat of the exhaust gas in the exhaust port 17 to the end part 71.

As illustrated in FIG. 5, the heat pipe 70 is a pipe member made of a material with high thermal conductivity (e.g., metal), and includes liquid working medium S therein in a vacuum state. A porous member 70a (e.g., metallic mesh) is provided in an inner wall of the heat pipe 70 to form a capillary structure, a so-called wick.

In the heat pipe 70, the end part 71 inserted into the exhaust port 17 (hereinafter, suitably referred to as "the heat-reception-side end part 71") is warmed up by the exhaust gas and, after exceeding a given temperature, the working medium S vaporizes, and as indicated by the arrow Y10 of FIG. 5, it spreads toward the other end part 72 inserted into the water supply passage 61 (hereinafter, suitably referred to as "the heat-release-side end part 72"). Here, the temperature of the exhaust gas in the exhaust port 17 decreases by applying its thermal energy to the heat pipe 70, i.e., the working medium S. Further the vapor of the working medium S condenses by releasing heat from the heat-release-side end part 72 to the water supply passage 61, and then reverts back to being liquid. Here, the water inside the water supply passage 61 is increased in temperature by receiving the thermal energy from the working medium S. As indicated by the arrow Y20 of FIG. 5, the working medium S, after reverting back to the liquid phase, returns to the heat-reception-side end part 71 due to the capillary action in the porous member 70a, and then retrieves thermal energy from the exhaust gas to change into vapor again. This thermal energy is applied to the water inside the water supply passage 61.

In this embodiment, the temperature of the exhaust gas within which the heat transfer occurs (reference temperature) is set to about 650 K, and the working medium S corresponding thereto is included in the heat pipe 70. For example, the working medium S is cesium.

Thus in this embodiment, when the temperature of the exhaust gas becomes high by exceeding the given temperature and the working medium S exceeds its boiling point due to the heat pipe 70, the thermal energy of the exhaust gas in the exhaust port 17 is applied to the water supply passage 61 and the temperature of the water therein is increased. Therefore, the temperature of the water inside the water supply passage 61 is substantially constantly increased by the heat exchanger 42, and when the temperature of the exhaust gas is high, which is above the reference temperature, the heat pipe 70 increases the temperature of the water inside the water supply passage 61 even higher by the exhaust gas, and the supercritical water is generated by effectively using the energy of the exhaust gas. Especially since the heat pipe 70 is disposed near the cylinder 2, the temperature of the water inside the water supply passage 61 is effectively increased by the heat pipe 70, using the high thermal energy of the exhaust gas. Further, when the exhaust gas temperature is excessively high, the temperature of the exhaust gas which flows into the purifying system 41 is lowered by the heat pipe 70, and when the exhaust gas temperature is low, the exhaust gas is flown into the purifying system 41 as it is so as to keep the purifying system 41 at a high temperature. Thus, the temperature of the purifying system 41 is kept within a suitable range.

(5) Control System (5-1) System Configuration

Figure 6:
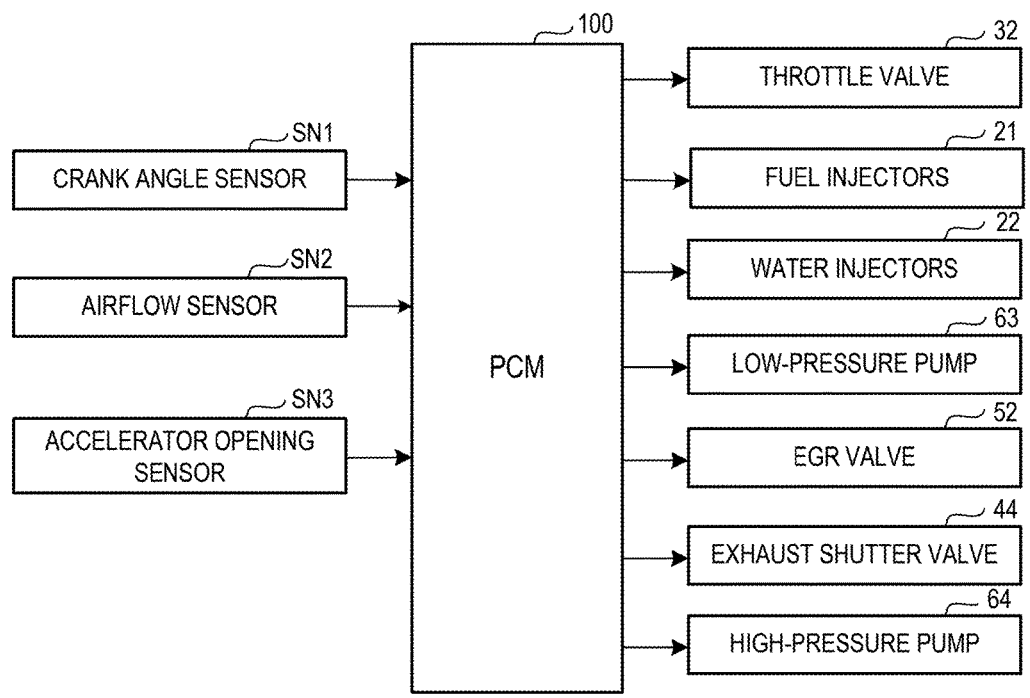
FIG. 6 is a block diagram illustrating a control system of the engine.

FIG. 6 is a block diagram illustrating a control system of the engine body. As illustrated in FIG. 6, the engine system of this embodiment is controlled by a Powertrain Control Module (PCM, may be referred to as the controller) 100 as a whole. The PCM 100 is, as well-known, comprised of a microprocessor including a CPU, a ROM, and a RAM.

The PCM 100 is electrically connected with various sensors for detecting an operating state of the engine.

For example, the cylinder block 3 is provided with a crank angle sensor SN1 for detecting a rotational angle and speed of a crankshaft, in other words, an engine speed. Further, an airflow sensor SN2 for detecting an air amount (fresh air amount) to be sucked into the cylinder 2 through the air cleaner 31 is provided in the intake passage 30, between the air cleaner 31 and the throttle valve 32. Moreover, an accelerator opening sensor SN3 for detecting a position of an accelerator pedal (accelerator opening) which is disposed out of the range of the drawings and controlled by a driver of the vehicle is provided to the vehicle.

The PCM 100 controls respective parts of the engine while performing various determinations, operations etc. based on input signals from the various sensors. Specifically, the PCM 100 is electrically connected with the fuel injectors 21, the water injectors 22, the throttle valve 32, the exhaust shutter valve 44, the EGR valve 52, the low-pressure pump 63, the high-pressure pump 64 etc., and outputs control signals to these components based on results of the operations, etc.

For example, as described above, the throttle valve 32 is closed only in a limited operation condition, such as when the engine is stopped. The PCM 100 closes the throttle valve 32 in such an operation condition.

Further, as described above, the PCM 100 injects the fuel into the cylinder 2 before the CTDC.

Further, as described above, the PCM 100 opens the EGR valve 52 within the engine operating range where an engine load is comparatively low, and further when the engine load is particularly low and the pressure in the exhaust passage 40 is low, the PCM 100 narrows the opening of the exhaust shutter valve 44. Moreover, the PCM 100 closes the EGR valve 52 and stops the recirculation of the EGR gas within the engine operating range where an engine load is comparatively high.

Figure 7:
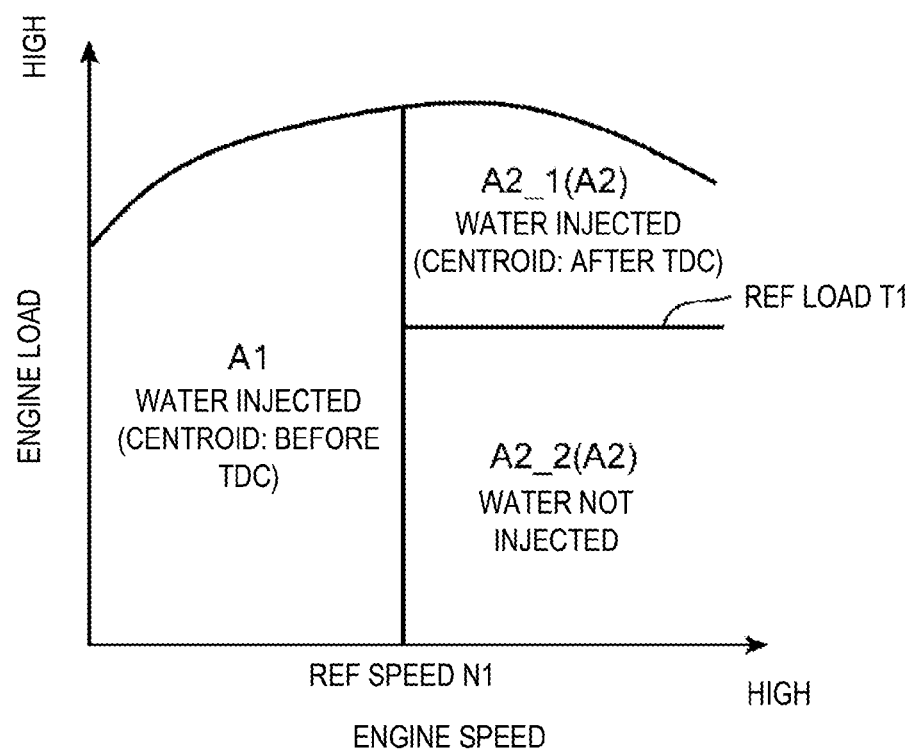
FIG. 7 is a chart illustrating a control range of the engine.

Further, the PCM 100 controls the water injector 22 based on a control map of FIG. 7. FIG. 7 is the control map of which a horizontal axis indicates the engine speed and a vertical axis indicates the engine load. As illustrated in FIG. 7, in this embodiment, a low speed range A1 where the engine speed is below a reference speed N1 and a high speed range A2 where the engine speed is the reference speed N1 or above are designed as a control range of the engine body. The high speed range A2 is designed to have a high-load, high-speed segment A2_1 where the engine load is a reference load T1 or above, and a low-load, high-speed segment A2_2 where the engine load is below the reference load T1. Hereinafter, controls relating to the water injection within the range and segments A1, A2_1 and A2_2 are respectively described.

(5-2) Low Speed Range

Within the low speed range A1, in order to improve fuel efficiency, the low-pressure pump 63 and the high-pressure pump 64 are driven to inject the supercritical water into the cylinder 2 from the water injector 22.

Note that within the low speed range A1, the exhaust gas temperature easily becomes low compared to the high speed range A2 due to a cooling loss being high, etc., and the supercritical water may not suitably be generated by the energy of the exhaust gas. Specifically within the low speed range A1, since the temperature of the exhaust gas is low, the heat pipe 70 does not operate and the condensed water may not suitably be increased in temperature with the exhaust gas by the heat exchanger 42.

Therefore, within the low speed range A1, the supercritical water is injected to extend an ignition delay time, so that the supercritical water is generated more reliably. In other words, by extending the ignition delay time so as to retard the timing of combustion, the temperature of the exhaust gas is increased and the temperature of the condensed water is also suitably increased by the heat exchanger 42, and the opportunity for the heat pipe 70 to operate is increased so that the supercritical water is generated more reliably.

Here, the ignition time delay is a period of time from the fuel injection until the mixture gas ignites, and here, the ignition timing is a timing at which a cool-flame reaction of the mixture gas ends and a hot-flame reaction starts.

Figure 8:
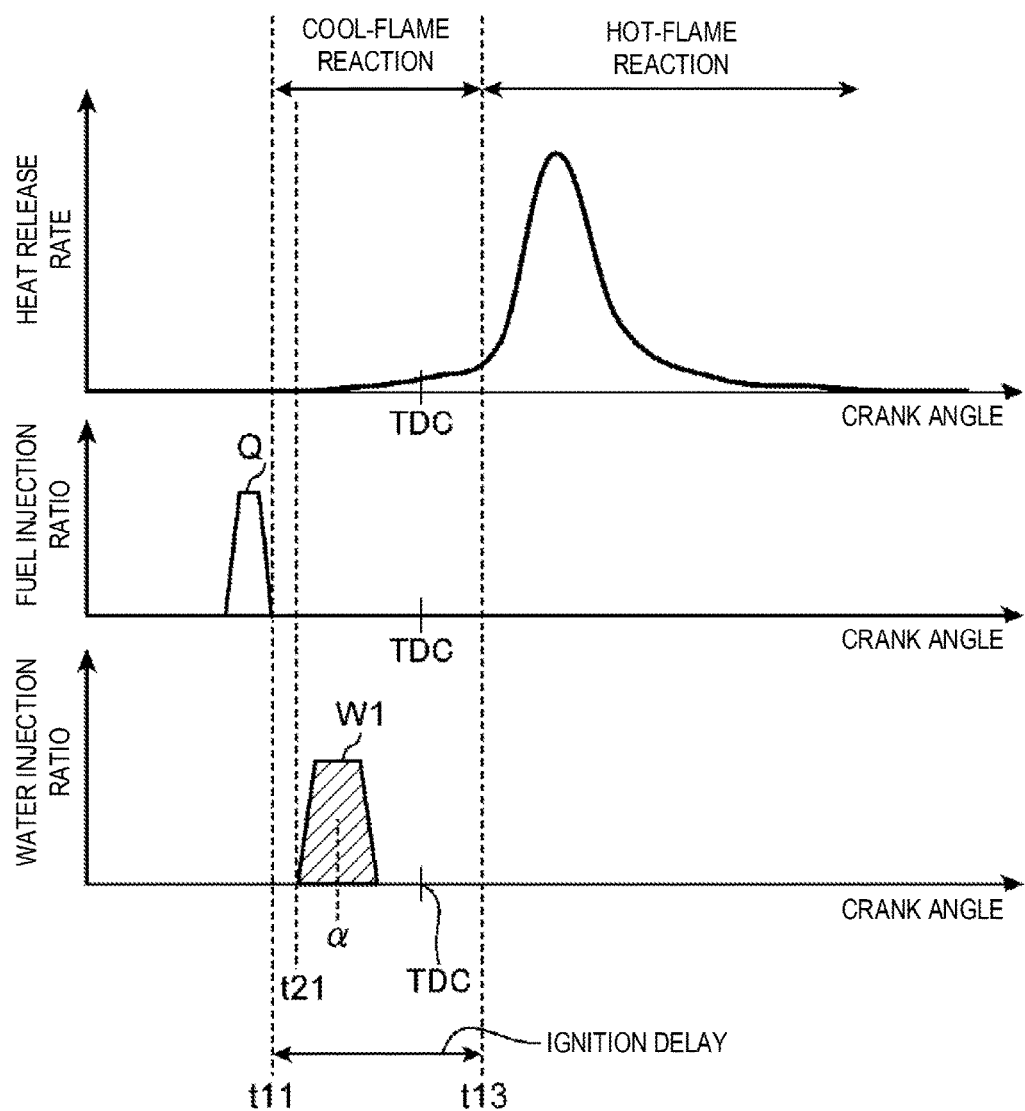
FIG. 8 shows charts illustrating a heat release rate, a fuel injection ratio, and a water injection ratio within a low speed range.

A specific description regarding this matter is given with reference to FIG. 8 which shows charts schematically illustrating one example of a heat release rate, a fuel injection ratio, and a water injection ratio when the premixed charge compression self-ignition combustion is performed within the low speed range A1.

As illustrated in FIG. 8, in the premixed charge compression self-ignition combustion, the fuel is injected at a timing t11 (injection Q1), then the mixture gas starts releasing heat (oxidation reaction) when the temperature and pressure reach given values, and accordingly, the heat release rate gradually increases or first gradually increases and then drops. Then, at a timing t13, the heat release rate sharply increases. Here, a low-temperature heat release which is the reaction occurring between the timings t11 and t13, and causes a slight heat generation to the extent that the cooling loss, etc. do not occur, is referred to as the cool-flame reaction. A main combustion which occurs after the cool-flame reaction is referred to as the hot-flame reaction. Further, the timing at which the hot-flame reaction starts (the timing at which the heat release rate sharply rises, corresponding to the timing t13 in FIG. 8) is referred to as the ignition timing. A period of time from the fuel injection timing (the timing t11 in FIG. 8) to the ignition timing defined as described above is referred to as the ignition delay time.

Note that, in FIG. 8, although the horizontal axis indicates the crank angle, the ignition delay time is a parameter defined by time, not the crank angle. Moreover, in the hot-flame reaction, the temperature of the mixture gas is known to be about 1,500 K or above. Therefore, a timing at which the temperature of the mixture gas reaches or exceeds 1,500 K may be the ignition timing and a period of time until this timing may be the ignition delay time. Further in FIG. 8, the case where the fuel injection is performed only once is illustrated; however, in a case where the fuel injection is performed by being divided into a plurality of injections, a period of time from the last fuel injection among the injections which cause the hot-flame reaction, until the hot-flame reaction starts is the ignition delay time.

Within the low speed range A1, as illustrated in FIG. 8, the injection of the supercritical water by the water injector 22 is started between the completion of a fuel injection Q1 and ignition of the mixture gas, so that the ignition delay time becomes longer. In other words, by leaving in the cylinder 2 water which is a substance which does not contribute in combustion (hereinafter, may be referred to as "the inactive substance") before the mixture gas ignition, the ratio of the fuel and air with respect to the entire gas inside the cylinder 2 is reduced and the increase of the gas temperature inside the cylinder 2 is suppressed. Thus, a reaction speed of the fuel and air is kept low and the ignition delay time is extended. Note that in the example of FIG. 8, the fuel is injected into the cylinder 2 by the fuel injector 21 to start the combustion in a latter half of the compression stroke (between 90° CA before the CTDC and the CTDC), and an injection W1 of the supercritical water into the cylinder 2 is performed in a given period from the completion timing t11 of the fuel injection Q1 until the CTDC.

Further within the low speed range A1, as illustrated in FIG. 8, the supercritical water is injected so that the cool-flame reaction period and a water injection period overlap. In the example of FIG. 8, a start timing t21 of the water injection W1 is close to a start timing of the cool-flame reaction.

Further, for the start timing of the water injection, it may be considered to inject the supercritical water into the cylinder 2 before the fuel injection completes. However, the present inventors found through their extensive research that the ignition delay time can be extended longer if the start timing of the water injection is after the fuel injection completion, rather than before the fuel injection completion.

Figure 9A:
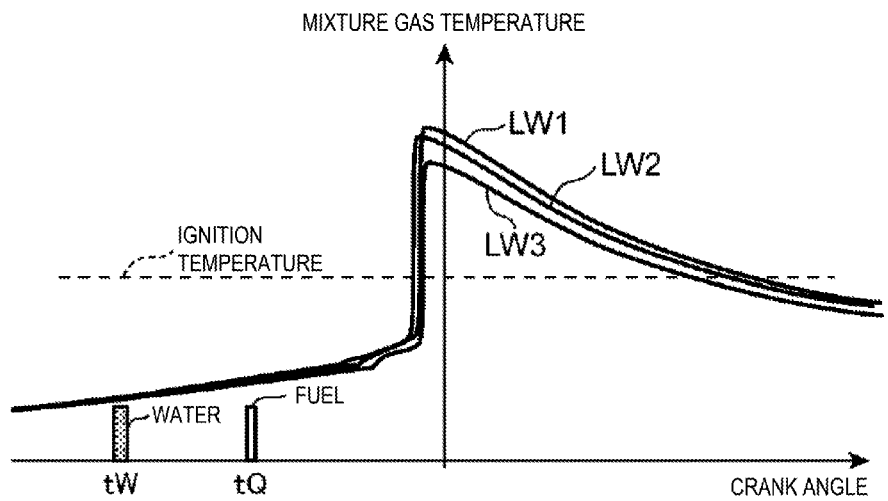
FIG. 9A is a chart illustrating a temperature of a mixture gas when a water injection timing is before a fuel injection timing.
Figure 9B:
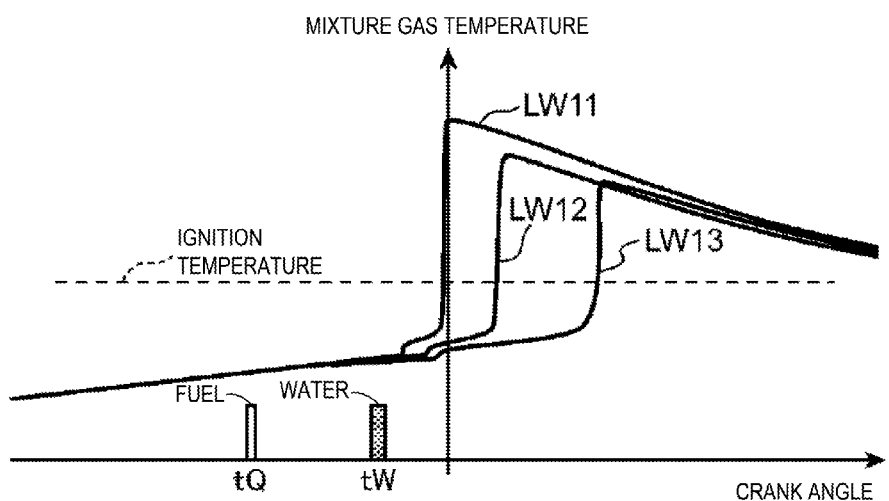
FIG. 9B is a chart illustrating a temperature of the mixture gas when the water injection timing overlaps with a cool-flame reaction period.

FIG. 9A illustrates a temperature of the mixture gas when a start timing tW of the water injection is before a fuel injection period tQ, specifically, before the fuel injection start timing, and FIG. 9B illustrates a temperature of the mixture gas when the start timing tW of the water injection is after the fuel injection period tQ, specifically, after the fuel injection completion timing. In FIG. 9A, LW1, LW2 and LW3 indicate mixture gas temperatures when the ratio of the injection amount of the supercritical water to the fuel injection amount is 1, 3, and 4 times, respectively. Similarly in FIG. 9B, LW11, LW12 and LW13 indicate mixture gas temperatures when the ratio of the injection amount of the supercritical water to the fuel injection amount is 1, 3, and 4 times, respectively.

As is apparent from a result of a comparison between FIGS. 9A and 9B, the ignition delay time becomes longer when the water injection is started after the fuel injection completion timing.

Moreover, the present inventors found that even after the fuel injection, the ignition delay time can be extended longer when the supercritical water is injected during the cool-flame reaction, rather than before the cool-flame reaction.

It is assumed that the ignition delay time can be extended longer because when the water is injected during the cool-flame reaction and the mixture gas combines with the water, a generation amount of formaldehyde during the cool-flame reaction increases and the heat release (oxidation reaction) becomes slower. Note that FIG. 9B is an example of a case where the supercritical water is injected during the cool-flame reaction.

Furthermore, the present inventors found that if the water is injected particularly in an initial stage of the cool-flame reaction, the heat release becomes even slower. Therefore, in this embodiment, the first water injection W1 is started during the cool-flame reaction, particularly in the initial stage thereof.

Here, in order to suitably obtain the engine torque, it is preferred that, as illustrated in FIG. 8, the hot-flame reaction which is the main combustion of the mixture gas is performed at a timing after the CTDC and comparatively close to the CTDC, and accordingly, the cool-flame reaction starts before the CTDC. Therefore in this embodiment, by controlling the timing of the water injection W1 as described above, a centroid α of the injection ratio of the water injection W1 becomes before the CTDC within the low speed range A1. In other words, in order to obtain more efficiently a work amount of the water injected into the cylinder 2, although it is preferable to inject a larger amount of water on expansion stroke, in this embodiment, within the low speed range A1, the ignition delay time is extended to generate and inject the supercritical water more reliably as described above so as to improve fuel efficiency. Note that the term "centroid" corresponds to a crank angle when the injection amount of the water reaches half of a total amount of the water injected for the water injection period.

Additionally, when the ignition delay time becomes longer as described above, effects are obtained, in which a more suitable premixed charge compression self-ignition combustion is realized and increases in combustion noises and smoke production are suppressed.

Specifically, in the premixed charge compression self-ignition combustion, if the ignition delay time which is the period of time from injection of the fuel into the cylinder 2 until the ignition of the fuel is short, the combustion starts in a state where the injected fuel is not sufficiently mixed with air, and the suitable premixed charge compression self-ignition combustion is not realized. As a result, an issue that pressure inside the cylinder 2, i.e., in-cylinder pressure, sharply rises and combustion noises become louder, and an issue that the smoke production increases, occurs. In this regard, when the ignition delay time becomes longer as described above, the combustion is generated in the state where the fuel is sufficiently mixed with the air, the suitable premixed charge compression self-ignition combustion is realized, and the increases in combustion noises and the smoke production are suppressed.

(5-3) Low-Load, High-Speed Segment

Within the low-load, high-speed segment A2_2, in order to improve the energy efficiency of the entire system, the low-pressure and high-pressure pumps 63 and 64 are stopped so that the injection of the supercritical water into the cylinder 2 from the water injector 22 is stopped.

Specifically, within the high speed range A2 where the engine speed is high, the mechanical resistance increases. However, within the low-load, high-speed segment A2_2, the thermal efficiency is comparatively high and the degradation of fuel efficiency is comparatively small. Therefore, within the low-load, high-speed segment A2_2, consumption of energy, such as power, which accompanies the driving of the low-pressure and high-pressure pumps 63 and 64, may exceed an amount of the fuel consumption reduced by a reduction effect which is obtained by injecting the supercritical water into the cylinder 2 from the water injector 22. For this reason, in this embodiment, in order to improve the energy efficiency of the entire system, within the low-load, high-speed segment A2_2, the low-pressure and high-pressure pumps 63 and 64 are stopped so that the injection of the supercritical water into the cylinder 2 from the water injector 22 is stopped as described above.

(5-4) High-Load, High-Speed Segment

On the other hand, within the high-load, high-speed segment A2_1, in addition to the increase of the mechanical resistance, the thermal efficiency is low. Therefore, the degradation level of fuel efficiency easily becomes worse. Further within the high-load, high-speed segment A2_1, the temperature of the exhaust gas easily becomes extremely high, and the exhaust passage 40 and the purifying system 41 may receive a thermal damage. For this reason, within the high-load, high-speed segment A2_1, in order to improve fuel efficiency and reduce the thermal damage of the purifying system 41, etc., the low-pressure and high-pressure pumps 63 and 64 are driven to inject the supercritical water into the cylinder 2 from the water injector 22.

Figure 10:
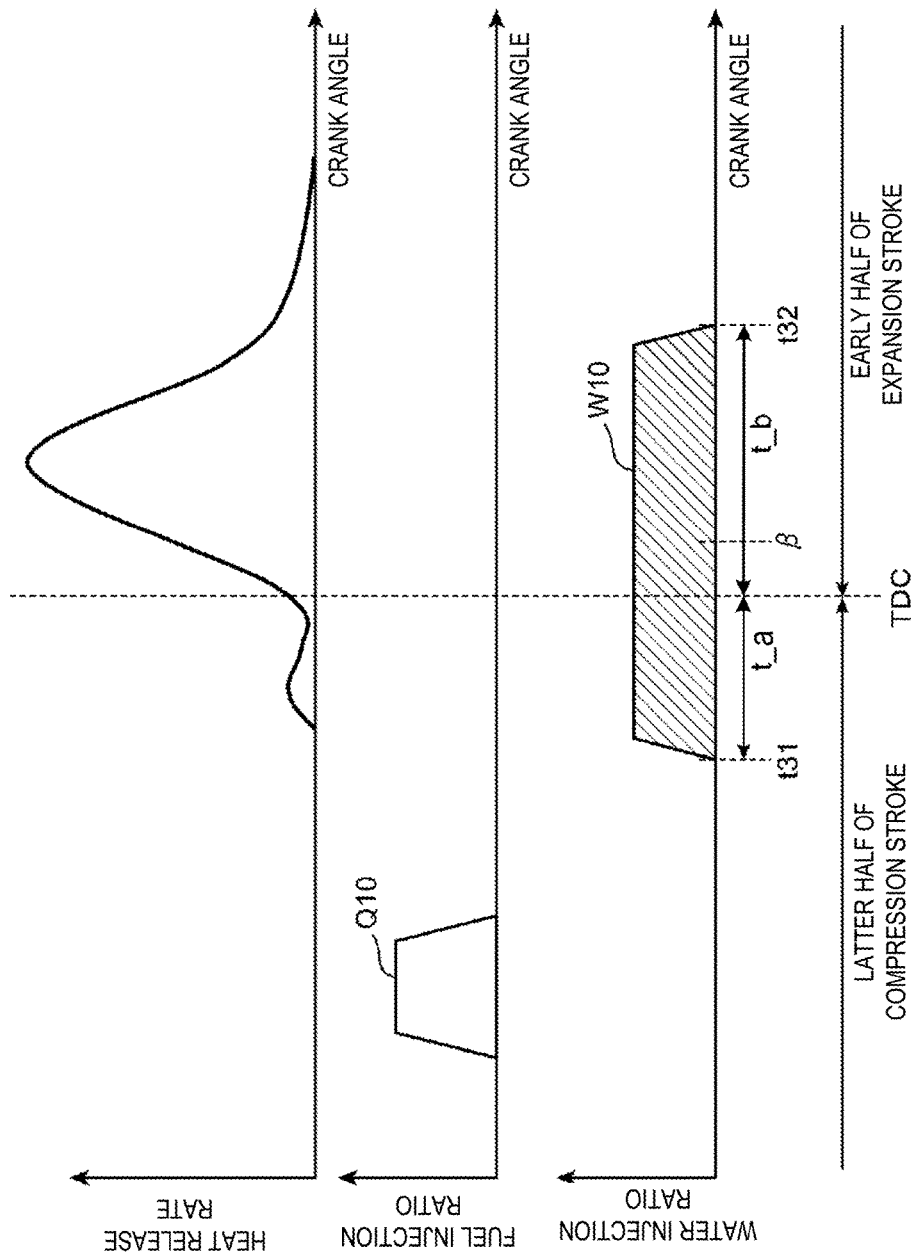
FIG. 10 shows charts illustrating a heat release rate, a fuel injection ratio, and a water injection ratio within a high speed range.

Here, within the high-load, high-speed segment A2_1, a period of time corresponding to 1° CA (one crank angle) is short, and in order to secure a sufficient amount of water injected into the cylinder 2, the water injection period needs to be longer in terms of crank angle compared to the low speed range A1. Therefore, within the high-load, high-speed segment A2_1, as illustrated in FIG. 10, a water injection W10 is performed for a given period to continue over the CTDC. In this embodiment, the water injection W10 is performed to continue from a timing t31 (after a given period from a fuel injection Q10 completion) to a timing t32 which is after the CTDC.

Further within the high-load, high-speed segment A2_1, since the temperature of the exhaust gas is sufficiently high as described above, there is no need to extend the ignition delay time to increase the temperature of the exhaust gas in order to generate the supercritical water as the low speed range A1. Therefore, within the high-load, high-speed segment A2_1, as illustrated in FIG. 10, a centroid β of the injection ratio of the water injection W10 is brought to after the CTDC so as to increase the work amount of the water. In this embodiment, the injection ratio of the water injection W10 is fixed and first and second water injection periods t_a and t_b are designed so that the second water injection period t_b from the CTDC to the completion timing t32 of the water injection is longer than the first water injection period t_a from the start timing t31 of the water injection to the CTDC, thus, the centroid β of the injection ratio of the water injection W10 is brought to after the CTDC.

Further, it is already known that injected water functions effectively by bringing the centroid β of the injection ratio of the water injection W10 to a given timing between the CTDC and 15° CA after the CTDC. Therefore, in this embodiment, the supercritical water is injected into the cylinder 2 so that the centroid β of the injection ratio of the water injection W10 is at a given timing between the CTDC and 15° CA after the CTDC, for example, 10° CA after the CTDC.

(6) Effects

As described above, in this embodiment, within the high-load, high-speed segment A2_1 where the degradation of fuel efficiency easily becomes comparatively large and the temperature of the exhaust gas easily becomes extremely high, the supercritical water is injected into the cylinder 2 for the given period including the CTDC, and the centroid β of the injection ratio of the supercritical water is brought to be on the retarding side of the CTDC.

Therefore, within the high-load, high-speed segment A2_1, a large total amount of the supercritical water injected into the cylinder 2 is secured and the amount of supercritical water supplied on the expansion stroke is increased, and thus the progression of expansion stroke with the supercritical water is stimulated and fuel efficiency is improved. Moreover, the temperature of the exhaust gas is lowered and the thermal damage of the purifying system 41, etc. is reduced. Especially within the high-load, high-speed segment A2_1, in order to lower the temperature of the exhaust gas so as to reduce the thermal damage of the purifying system 41, etc., so-called enrichment is conventionally performed, in which an excessive amount of fuel is injected into the cylinder 2, whereas in this embodiment, the temperature of the exhaust gas is reduced without the enrichment or while reducing the excessive fuel amount, and thus, fuel efficiency is effectively improved.

Further in this embodiment, since the supercritical water which has a higher density than normal water and requires no latent heat is injected into the cylinder 2, a large amount of water is efficiently injected into the cylinder 2, and the thermal efficiency and fuel efficiency of the engine are improved more reliably as described above.

Further in this embodiment, the water within the exhaust gas in the exhaust passage 40 is utilized and this water is increased in temperature with the energy of the exhaust gas by the heat exchanger 42 and the heat pipe 70 so as to generate the supercritical water. Therefore, the energy efficiency of the entire system is improved.

Further, within the low speed range A1 where the temperature of the exhaust gas easily becomes low, at least a portion of the supercritical water is injected during a cool-flame reaction period, thus, the ignition delay time of the mixture gas is extended and the combustion timing is retarded. Therefore, also within the low speed range A1, the supercritical water is suitably generated by the energy of the exhaust gas and fuel efficiency is improved by this supercritical water.

(7) Modifications

In this embodiment, the case where the supercritical water (i.e., water) is injected into the cylinder 2 is described; however, as described above, instead of the supercritical water, subcritical water which has properties similar to the supercritical water may be injected into the cylinder 2. Also in this case, since the density is higher than normal water and the required latent heat is extremely low, the large amount of water is efficiently injected into the cylinder 2, and the thermal efficiency and fuel efficiency of the engine are improved more reliably.

Further in this embodiment, the case where the injection of the supercritical water into the cylinder 2 is stopped within the low-load, high-speed segment A2_2 which is the part of the high speed range A2 where the engine load is below the reference load T1 is described; however, the supercritical water may be injected into the cylinder 2 within the low-load, high-speed segment A2_2.

Note that, as described above, within the low-load, high-speed segment A2_2, the consumption of energy, such as power, which accompanies the driving of the low-pressure and high-pressure pumps 63 and 64, may exceed the reduced amount of the fuel consumption amount in the reduction effect which is obtained by injecting the supercritical water into the cylinder 2 from the water injector 22. For this reason, by stopping the low-pressure and high-pressure pumps 63 and 64 to stop the injection of the supercritical water into the cylinder 2 from the water injector 22 within the low-load, high-speed segment A2_2, the energy efficiency of the entire system is improved more reliably.

Further, the water circulation device 60 may be omitted and, for example, a heater may separately be provided to generate the supercritical water. Note that by providing the water circulation device 60 as described above, it is possible to improve the energy efficiency of the entire system.

Further in this embodiment, within the high-load, high-speed segment A2_1, the case is described, in which the centroid β of the injection ratio of the water injection W10 is brought to after the CTDC by adjusting the water injection timing, specifically, by fixing the water injection ratio and designing the second water injection period t_b from the CTDC to the completion timing t32 of the water injection to be longer than the first water injection period t_a from the start timing t31 of the water injection to the CTDC; however, the centroid β may be brought to after the CTDC by changing the injection ratio of the water injection W10 over time (crank angle). For example, the centroid β may be brought to after the CTDC by increasing the water injection ratio after the CTDC while designing the time length from the start timing of the water injection to the CTDC to be the same as the time length from the CTDC to the completion timing of the water injection, so that the total amount of water injected into the cylinder 2 after the CTDC becomes larger than the amount before the CTDC.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
2 Cylinder
21 Fuel Injector (Fuel Supplier)
22 Water Injector
42 Heat Exchanger (Temperature Increasing Device)
60 Water Circulation Device
70 Heat Pipe (Temperature Increasing Device)
100 PCM (Controller)
A1 Low Speed Range (Low Engine Speed Operating Range)
A2 High Speed Range (High Engine Speed Operating Range)
A2_1 High-load, High-speed Segment
A2_2 Low-load, High-speed Segment

What is claimed is:

1. A control system of an engine including a cylinder, a piston, and a fuel injector for injecting fuel into the cylinder, the fuel mixing with air to form a mixture gas and combusting inside the cylinder, comprising:
   a water injector for injecting one of supercritical water or subcritical water into the cylinder; and
   a controller operatively coupled to the fuel injector and the water injector, wherein within a high engine speed operating range where an engine speed is a given reference speed or above, the controller is configured to control the water injector to inject the one of supercritical water or subcritical water into the cylinder after fuel injection is complete such that an injection timing of the one of supercritical water or subcritical water does not interfere with the fuel injection, the one of supercritical water or subcritical water injected for a given period spanning before a top dead center position of the piston on a compression stroke to after the top dead center position, such that when an injection amount of the one of supercritical water or subcritical water reaches half of a given injection amount, a crank angle of the engine is after the top dead center position, the given injection amount being a total amount of the one of supercritical water or subcritical water injected during the given period; and wherein within a low engine speed operating range where the engine speed is below the given reference speed, the controller is configured to control the water injector to inject the one of supercritical water or subcritical water for a given period that at least partially overlaps with a period in which a cool-flame reaction of the mixture gas occurs inside the cylinder.

2. The system of claim 1, wherein the engine is a four-stroke engine, and wherein within the high engine speed operating range, the controller is configured to control the injection of the one of supercritical water or subcritical water such that the crank angle when the injection amount of the one of supercritical water or subcritical water reaches the half of the given injection amount corresponds to a given timing between the top dead center position of the compression stroke and 15° CA (crank angle) after the top dead center position.

3. The system of claim 1, further comprising a heat exchanger for increasing a temperature of the one of supercritical water or subcritical water supplied to the water injector, by using exhaust gas discharged from the engine.

4. The system of claim 1, wherein the controller is configured to control the water injector to inject the one of supercritical water or subcritical water into the cylinder within a high-load, high-speed segment that is a part of the high engine speed operating range where an engine load is a reference load or above, and the controller is configured to control the water injector to stop the injection of the one of supercritical water or subcritical water into the cylinder within a low-load, high-speed segment that is a part of the high engine speed operating range where the engine load is below the reference load.

* * * * *